Dec. 8, 1925.
E. GAUTHIER
1,565,089
RECIPROCATING MECHANISM
Filed Dec. 7, 1921
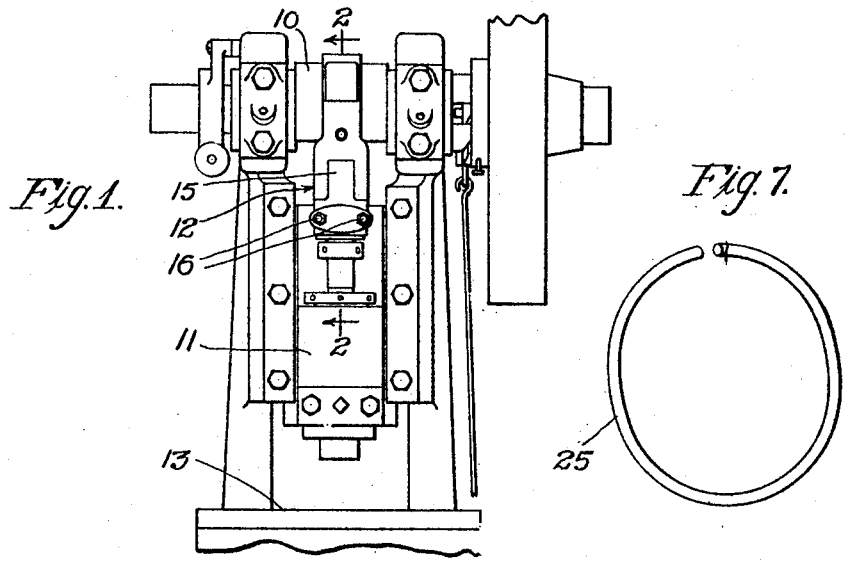
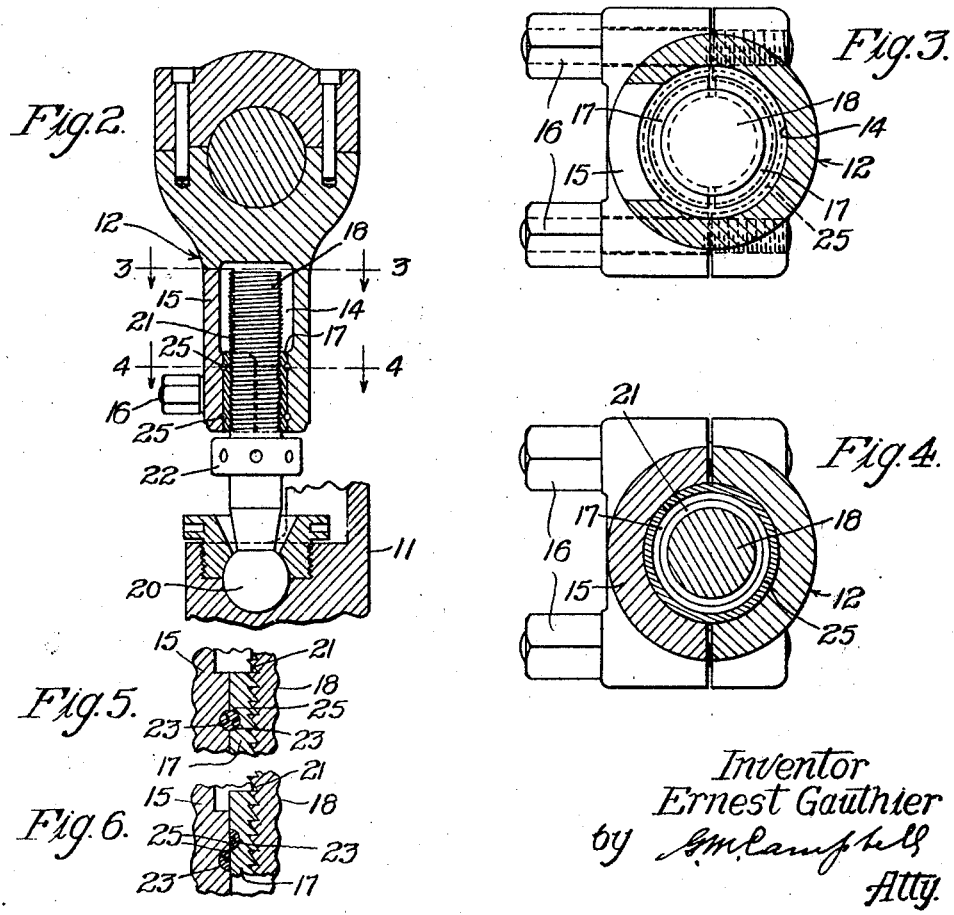
Inventor
Ernest Gauthier Patented Dec. 8, 1925.

1,565,089

UNITED STATES PATENT OFFICE.

ERNEST GAUTHIER, OF CHICAGO, ILLINOIS, ASSIGNOR TO WESTERN ELECTRIC COMPANY, INCORPORATED, OF NEW YORK, N. Y., A CORPORATION OF NEW YORK.

RECIPROCATING MECHANISM.

Application filed December 7, 1921. Serial No. 520,502.

*To all whom it may concern:*

Be it known that I, ERNEST GAUTHIER, a citizen of the United States, residing at Chicago, in the county of Cook and State of Illinois, have invented certain new and useful Improvements in Reciprocating Mechanisms, of which the following is a full, clear, concise, and exact description.

This invention relates to improvements in the construction and operation of reciprocating mechanisms such as punch presses and has for its object to improve the construction and operation of such mechanisms to prevent breakage and injury to the parts thereof or the tools used therewith due to overloads or careless operation.

The improvements of this invention reside in general in the construction of the pitman or reciprocating part of the machine whereby there is provided in this part of the mechanism an overload safety construction which will prevent damage to the parts upon excessive thrust upon the pitman. More specifically, the invention consists in the construction of the pitman or reciprocating part in two relatively movable parts normally retained against relative movement by means of shearable rings or devices which will be destroyed in response to excessive thrust to permit the relative movement of the two parts of the pitman and prevent injury of the parts other than the shearing of the shearing rings. The thrust required to shear the rings is in excess of the force required to do any particular work for which the press is designed but less than the force required to break or injure the parts of the press or the tools used therewith. The construction of the pitman is such that the rings may be quickly and easily replaced.

In the drawings:

Fig. 1 is a fragmentary front view of a punch press equipped with the invention;

Fig. 2 is an enlarged fragmentary vertical sectional view taken on the line 2—2 of Fig. 1;

Fig. 3 is a plan section taken on the line 3—3 of Fig 2;

Fig. 4 is a plan section taken on the line 4—4 of Fig. 2;

Fig. 5 is an enlarged fragmentary view of Fig. 2 showing more clearly the device inserted between two members of the pitman;

Fig. 6 is a similar view showing the safety device sheared due to an overload on the press, and Fig. 7 is a perspective view of the preferred form of the safety device.

As shown in the drawings, the invention has been embodied in a power punch press of a well-known type, and referring to Fig. 1, a crank-shaft is indicated at 10 connected to a die head 11 by a pitman 12. The bed of the press is indicated at 13 between which and the die head 11 the work to be operated upon is positioned. The pitman 12, as shown in Fig. 2, is formed with a circular opening 14 at its lower end and is equipped with a removable cap 15 which when removed forms an opening in the front face of the pitman 12 from its lower end to substantially the top of the opening 14. The cap 15 is secured to the pitman 12 by bolts 16. Closely fitting within the opening 14 and at its lower end is a sleeve 17 made of two similar parts (see Fig. 3). At the lower end of the pitman and passing between the two parts forming the sleeve 17 and into the opening 14 is a connection screw 18 for connecting the pitman 12 with the die head 11 through a ball type connection indicated at 20. Formed in the two parts forming the sleeve 17 and that portion of the connection screw 18 inserted within the opening 14 is a buttress or ratchet type screw thread 21 which with the clamping in place of the two part sleeve 17, due to the bolting in place of the cap 15, forms a very effective means for securing the connection screw 18 in place after the machine has been set for the work to be done. A suitable collar 22 is formed on the screw 18 for turning it when setting the machine. Formed in the wall of the opening 14 and also in the outer surface of the two-part sleeve 17 are coinciding annular grooves or channels 23, 23. In the drawings the grooves are shown circular in cross section and carried therein is a suitable length of wire forming a split ring 25, as clearly shown in Fig. 7. The grooves are of a size which will just admit a standard size of wire —for instance, one-eighth inch in diameter.

It will readily be understood that the linear length of wire carried in the grooves 23 will vary according to the capacity of the machine and the delicacy of the tools used therewith. In the drawings the rings are shown full length—that is, a length sufficient to pass substantially around the two-part sleeve 17. In another case the wire might extend only half way around the sleeve 17. In case a very delicate set of tools were being used, the length of wire carried in a groove would be a fraction of a full length ring.

In machines not equipped with an overload safety device, some part of the machine will break or be overstrained when the capacity of the machine is exceeded. This breaking or overstraining happens when the head 11 in moving down to the work meets with a resistance which the machine is not built for. By mounting the connecting screw 18 in the split sleeve 17 and securing the sleeve to the pitman by the split rings 25 located in the grooves or channels 23 a cheap and easily replaceable member is provided in the pitman which will be sheared (see Fig. 6) when the capacity of the machine is exceeded, and thereby prevent injury to the pitman and other parts of the machine. The split rings after being sheared are easily removed by merely removing the cap 15 and then moving the connection screw 18 forward about its ball connection 20. The movement forward of the screw 18 and the size of the opening 14 formed in the pitman 12 by removing the cap 15 is sufficient to allow the two-part sleeve 17, held together by the sheared split ring 25 about the screw 17, to be unscrewed therefrom. The new split rings to be replaced may be coils cut from a long coil of wire prepared beforehand for replacement purposes, or the split rings may be cut to a suitable length from a straight piece of wire and formed around the split sleeve.

After placing the split rings in the grooves in the split sleeve the sleeve is screwed back into place on the connection screw 18 and the screw moved back into the opening 14, after which the cap 15 is bolted lightly in place. The stroke of the machine is then reset, if it is found necessary, by turning the collar 22 and thereafter the cap 15 is finally bolted in place, which causes the threads on the two-part sleeve to be firmly wedged into the threads on the connection screw 18.

In the preferred embodiment of the invention the split rings are of metal, preferably brass, and circular in cross section, but it will readily be understood that any suitable material and cross sectional shape may be used with substantially the same results.

In adapting the invention to a machine the capacity of the machine and the factor of safety at which it is to be operated is first decided. From this decision the number of split rings either full or partial and the cross sectional area thereof to be used in the pitman of the machine and which will be sheared before injury to the pitman or other parts of the machine is calculated.

A punch press is designed with a large factor of safety to guard against extremes of from no load to great overloads, but in a punch press equipped with this invention, where provision is made to take care of all the excess loads, the factor of safety need not be as large, and therefore the rating can be greatly increased without the slightest danger of overstrains.

What is claimed is:

1. In a punch press or similar operating mechanism, a pair of telescopic members forming the pitman of the mechanism, and a shearable element interposed between the adjacent surfaces of the telescopic members adapted to normally retain them against relative movement but shearable by excessive thrust to permit relative movement of the two members.

2. In a punch press or similar operating mechanism, a pair of telescopic members forming the pitman of the mechanism, a shearable element interposed between the adjacent surfaces of the telescopic members adapted to normally retain them against relative movement but shearable against excessive thrust to permit relative movement of the two members, the outer of said telescopic members having a removable portion to afford access to said shearable element.

3. In a punch press or similar operating mechanism, a pair of telescopic members forming a pitman the engaging surfaces of said members being provided with registering grooves, and means in said grooves forming an operative connection between said members, said means being adapted to give in response to excessive pressure on the pitman to permit relative movement of the telescopic parts.

4. In a punch press or similar operating mechanism, a pair of telescopic members forming a pitman, the engaging surfaces of said members being provided with coinciding annular grooves, and shearable rings inserted in said grooves to normally retain said members against relative movement.

5. In a punch press or similar operating mechanism, a pair of telescopic members forming a pitman, the engaging surfaces of said members being provided with coinciding annular grooves, and metal rings of circular cross section located in said grooves adapted to retain said members against relative movement under normal thrust upon the pitman but to be sheared by excessive thrust thereon to permit relative movement of the two members.

6. In a punch press or similar operating mechanism, a pitman comprising a screw threaded member, a screw threaded bushing adapted to receive said member, a two-part socket member adapted to receive the bushing, and removable means cooperating with said bushing and said socket member to normally hold them against relative movement but responsive to excessive thrust on the pitman to permit relative movement of said bushing and socket.

In witness whereof, I hereunto subscribe my name this 25 day of November A. D, 1921.

ERNEST GAUTHIER.